(12) United States Patent
Kim

(10) Patent No.: US 11,807,306 B2
(45) Date of Patent: Nov. 7, 2023

(54) VEHICLE BODY STRUCTURE

(71) Applicants: Hyundai Motor Company, Seoul (KR); Kia Corporation, Seoul (KR)

(72) Inventor: Hyung Tae Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 218 days.

(21) Appl. No.: 17/237,786

(22) Filed: Apr. 22, 2021

(65) Prior Publication Data

US 2022/0105991 A1    Apr. 7, 2022

(30) Foreign Application Priority Data

Oct. 5, 2020 (KR) .................. 10-2020-0128133

(51) Int. Cl.
*B62D 25/20* (2006.01)
*B60K 15/07* (2006.01)
*B60K 1/04* (2019.01)

(52) U.S. Cl.
CPC .............. *B62D 25/20* (2013.01); *B60K 1/04* (2013.01); *B60K 15/07* (2013.01); *B60K 2001/0438* (2013.01)

(58) Field of Classification Search
CPC .......... B62D 25/20; B60K 1/04; B60K 15/07; B60K 2001/0438
See application file for complete search history.

(56) References Cited

U.S. PATENT DOCUMENTS

| | | | |
|---|---|---|---|
| 2006/0272877 A1* | 12/2006 | Nozaki | |
| 2020/0047808 A1* | 2/2020 | Ajisaka | |
| 2021/0221436 A1* | 7/2021 | Tsuyuzaki | |
| 2022/0063730 A1* | 3/2022 | Takahashi | |

* cited by examiner

*Primary Examiner* — James A Shriver, II
*Assistant Examiner* — Nicholas R. Kandas
(74) *Attorney, Agent, or Firm* — Slater Matsil, LLP

(57) ABSTRACT

A vehicle body structure includes a battery mounting part provided below a floor for mounting at least one battery, first and second cross members to reinforce the floor in front of and behind the battery mounting part, respectively, left and right center side members extending in a front-rear direction and connecting the first cross member and the second cross member, wherein the left and right center side members are spaced apart from each other in a left-right direction and reinforce a portion of the floor, a fuel tank mounting part provided below the floor behind the second cross member, left and right reinforcing frames extending rearward from rear ends of the left and right center side members, respectively, to reinforce the floor, and left and right extension members extending rearward from rear ends of the left and right reinforcing frames, respectively, to reinforce the floor.

20 Claims, 7 Drawing Sheets

VEHICLE BODY STRUCTURE

CROSS-REFERENCE TO RELATED APPLICATIONS

This application claims the benefit of Korean Patent Application No. 10-2020-0128133, filed in the Korean Intellectual Property Office on Oct. 5, 2020, which application is hereby incorporated herein by reference.

TECHNICAL FIELD

The disclosure relates to a vehicle body structure.

BACKGROUND

Hybrid electric vehicles (HEVs) and plug-in hybrid electric vehicles (PHEVs) include large-capacity batteries as well as fuel tanks due to the characteristics of a drive system thereof.

Because these vehicles have large-capacity batteries installed on rear floor sides, it is necessary to locally reinforce torsional stiffness, front-rear bending stiffness, and left-right bending stiffness of a vehicle body structure around the battery.

However, because the reinforcement of a conventional vehicle body structure is performed by locally increasing the rigidity of a fastening portion to fix a battery to the vehicle body structure, there is a limit to overall increase of the rigidity of the vehicle body structure.

SUMMARY

The disclosure relates to a vehicle body structure. Particular embodiments relate to a vehicle body structure capable of increasing torsional stiffness, front-rear and left-right bending stiffness by improving the coupling and supporting structure of a battery.

An embodiment of the disclosure provides a vehicle body structure capable of increasing torsional stiffness, front-rear and left-right bending stiffness by improving the coupling and supporting structure of a battery and capable of dispersing impact load.

Additional embodiments of the disclosure will be set forth in part in the description which follows and, in part, will be obvious from the description, or may be learned by practice of the disclosure.

In accordance with an embodiment of the disclosure, a vehicle body structure includes a battery mounting part provided below a floor to mount at least one battery, a first cross member to reinforce the floor in front of the battery mounting part, a second cross member to reinforce the floor in the rear of the battery mounting part, left and right center side members extending in a front-rear direction to connect the first cross member and the second cross member and spaced apart from each other in a left-right direction to reinforce the floor on which the battery mounting part is located, a fuel tank mounting part provided below the floor in the rear of the second cross member to mount the fuel tank, left and right reinforcing frames extending rearward from rear ends of the left and right center side members, respectively, to reinforce the floor in front of the fuel tank mounting part, and left and right extension members extending rearward from rear ends of the left and right reinforcing frames, respectively, to reinforce the floor on which the fuel tank mounting part is located.

The vehicle body structure may further include a third cross member reinforcing the floor in front of the fuel tank mounting part and connected to rear ends of the left and right reinforcing frames and front ends of the left and right extension members, and a fourth cross member reinforcing the floor behind the fuel tank mounting part and connected to the left and right extension members.

The vehicle body structure may further include a plurality of reinforcing members provided on the third cross member to reinforce portions where the rear ends of the left and right reinforcing frames and the front ends of the left and right extension members are connected.

The vehicle body structure may further include left and right front side members extending forward from both sides of the first cross member at positions to which the left and right center side members are connected, respectively, to reinforce a front area of the floor.

The vehicle body structure may further include left and right side sills extending long in the front-rear direction to reinforce left and right ends of the floor, respectively, and connected to the first and second cross members.

The vehicle body structure may further include a battery coupling structure installed below the floor to couple the at least one battery to be fastened to the first and second cross members.

The battery coupling structure may include a battery support panel installed below the floor between the first cross member and the second cross member, a left coupling frame provided to couple a lower portion of the at least one battery in the front-rear direction and having one side fastened to the first cross member at a position where the left center side member is connected and the other side fastened to the second cross member at a position where the left center side member is connected, and a right coupling frame provided to couple the lower portion of the at least one battery in the front-rear direction and having one side fastened to the first cross member at a position where the right center side member is connected and the other side fastened to the second cross member at a position where the right center side member is connected.

The battery coupling structure may further include a plurality of transverse coupling frames provided to couple the lower portion of the at least one battery in the left-right direction and fastened to the left or right side sill and the battery support panel.

The vehicle body structure may further include a plurality of reinforcing members provided on the first cross member and the second cross member to reinforce portions to which the left and right coupling frames are fastened.

The vehicle body structure may further include a left coupling band having one side fastened to the left reinforcing frame and the other side fastened to the fourth cross member at a position where the left extension member is connected to couple a lower portion of the fuel tank in the front-rear direction, and a right coupling band having one side fastened to the right reinforcing frame and the other side fastened to the fourth cross member at a position where the right extension member is connected to couple the lower portion of the fuel tank in the front-rear direction.

The vehicle body structure may further include a plurality of reinforcing members provided on the left and right reinforcing frames and the fourth cross member to reinforce portions to which the left and right coupling bands are fastened.

BRIEF DESCRIPTION OF THE DRAWINGS

These and/or other features of the disclosure will become apparent and more readily appreciated from the following description of the embodiments, taken in conjunction with the accompanying drawings, in which.

DETAILED DESCRIPTION OF ILLUSTRATIVE EMBODIMENTS

Hereinafter embodiments of the disclosure will be described in detail with reference to the accompanying drawings. The embodiments described below are provided by way of example so that those skilled in the art will be able to fully understand the spirit of the disclosure. The disclosure is not limited to the embodiments described below, but may be embodied in other forms. In order to clearly explain the disclosure, parts not related to the description are omitted from the drawings, and the width, length, thickness, etc. of the components may be exaggerated for convenience.

In the description of the disclosure, terms for positions or directions such as "front", "rear", "left", and "right" refer to positions or directions in a state in which a vehicle body structure according to the disclosure is applied to a vehicle.

Figure 1:
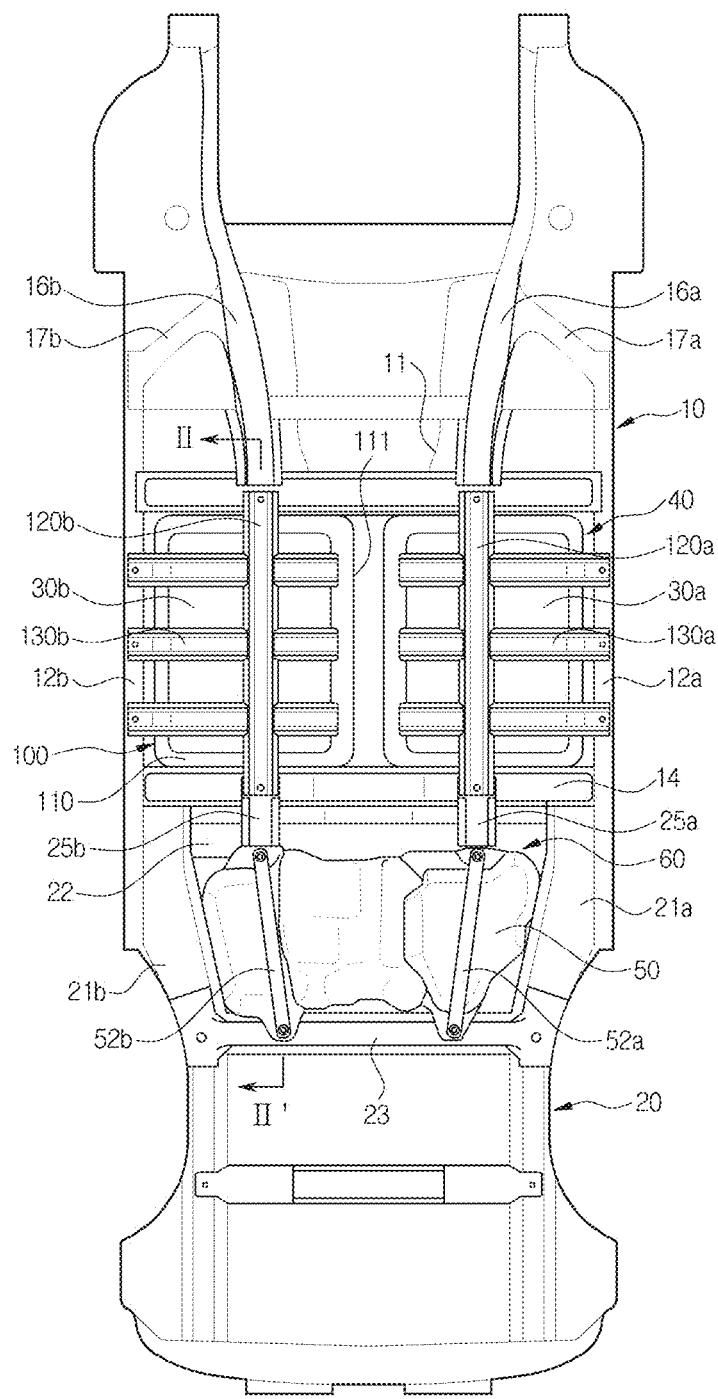
FIG. 1 is a bottom view of a vehicle body structure according to an embodiment of the disclosure.
Figure 2:
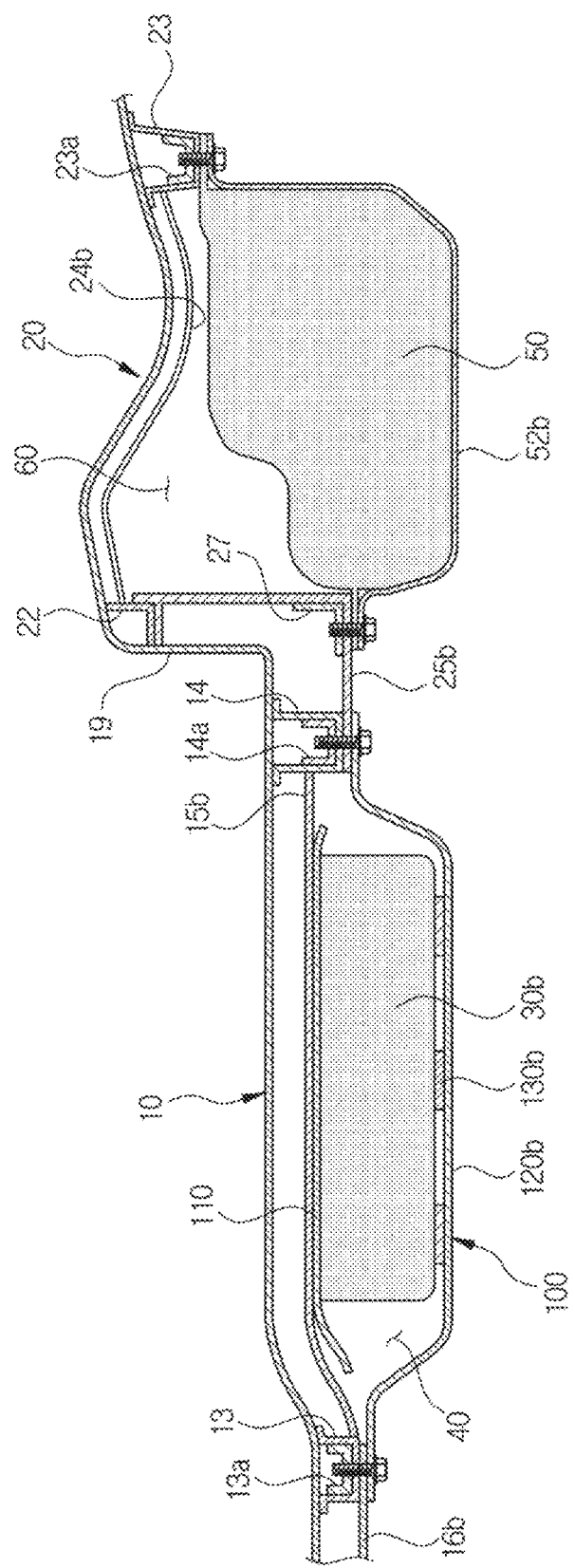
FIG. 2 is a cross-sectional view taken along line II-II' in FIG. 1.
Figure 3:
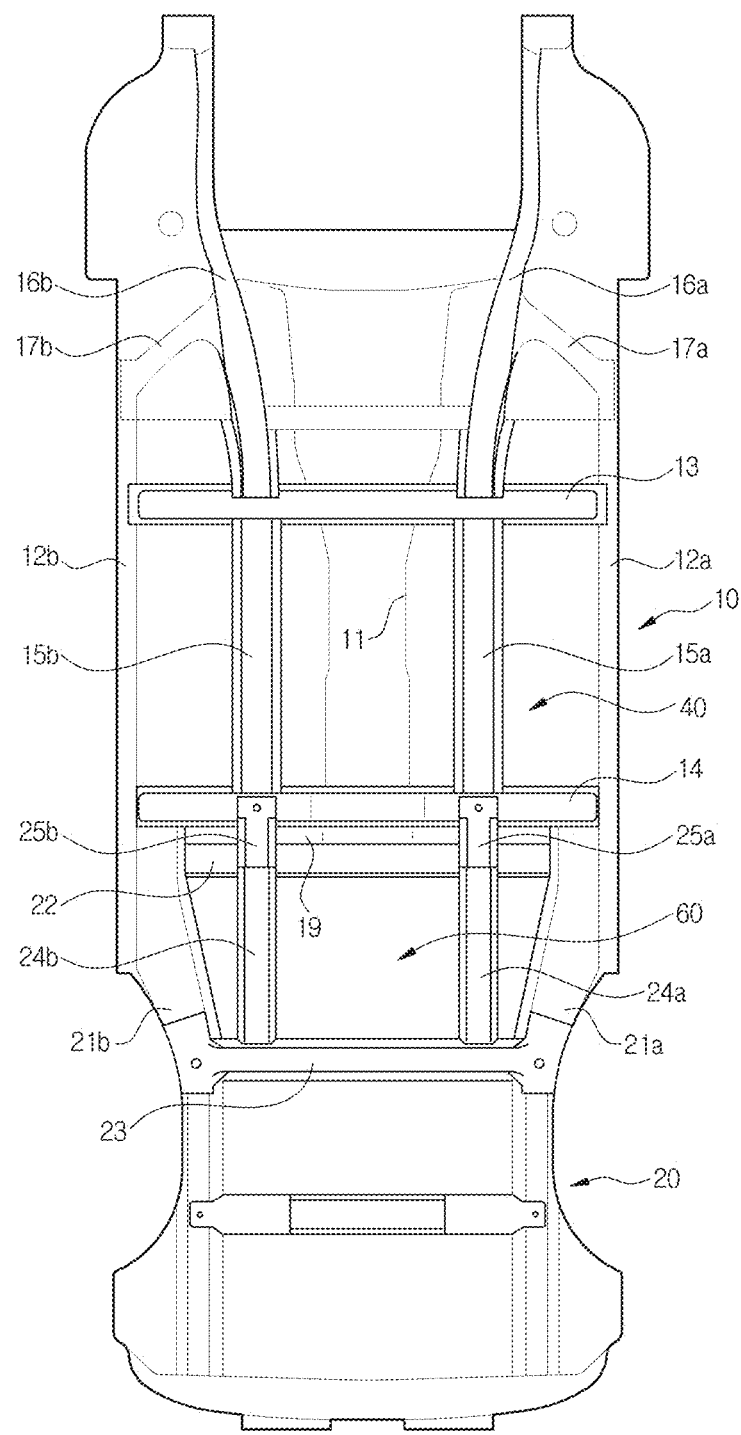
FIG. 3 is a bottom view of the vehicle body structure according to an embodiment of the disclosure from which left and right batteries and a fuel tank are separated.

Referring to FIGS. 1 to 3, a vehicle body structure according to an embodiment of the disclosure includes a center floor 10 forming an interior bottom of a vehicle, a rear floor 20 forming a rear bottom of the vehicle, a battery mounting part 40 provided below the center floor 10 and on which one or more batteries 30a and 30b are mounted, a battery coupling structure 100 installed below the center floor 10 to couple the one or more batteries 30a and 30b, and a fuel tank mounting part 60 provided below the rear floor 20 at the rear of the battery mounting part 40 for mounting the fuel tank 50.

Figure 4:
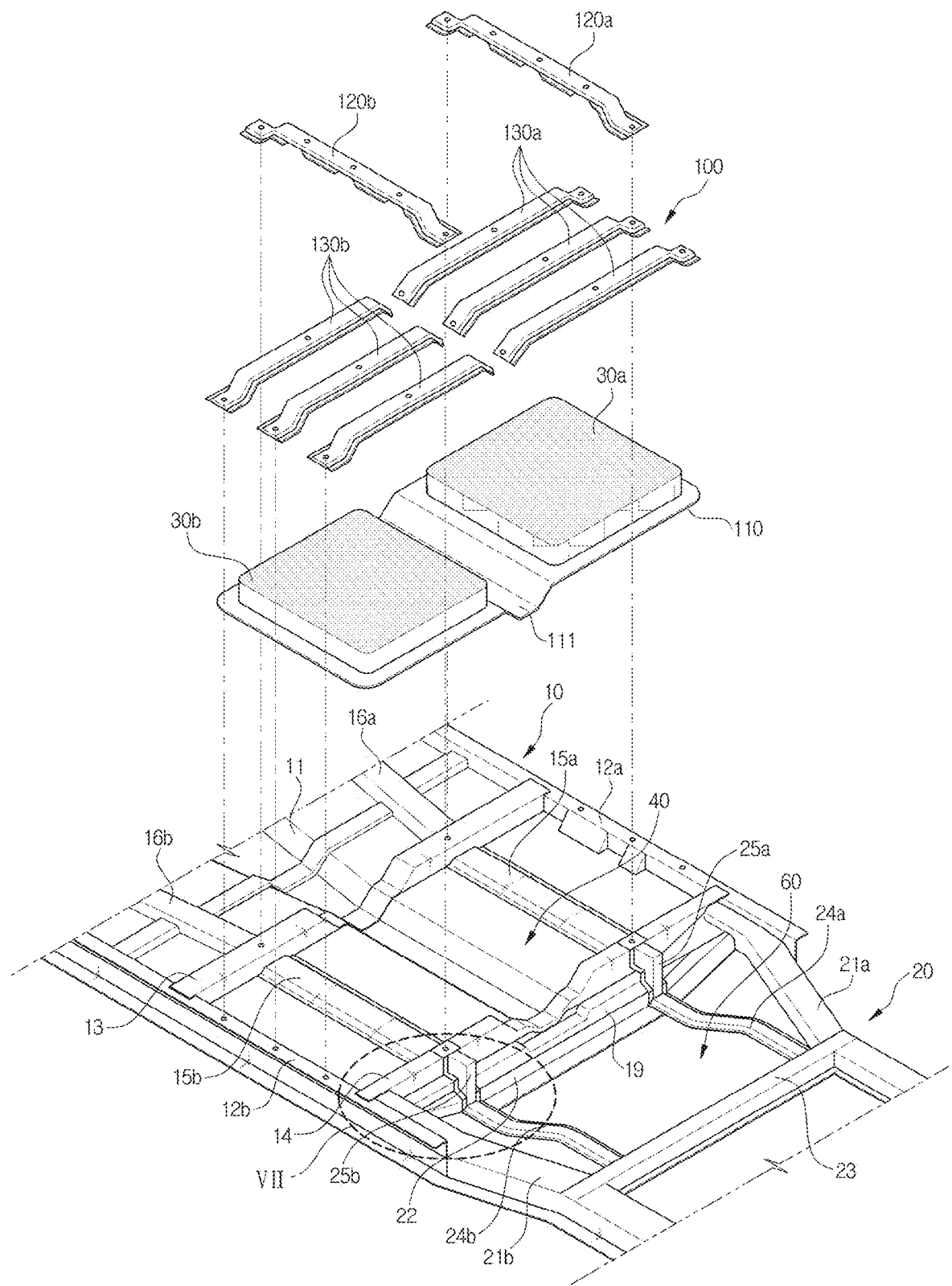
FIG. 4 is a bottom perspective view of the vehicle body structure according to an embodiment of the disclosure from which the batteries and a battery coupling structure are separated.

As illustrated in FIGS. 2 to 4, the center floor 10 may include a center tunnel 11, left and right side sills 12a and 12b, a first cross member 13, a second cross member 14, left and right center side members 15a and 15b, and left and right front side members 16a and 16b.

The center tunnel 11 is provided to extend long in a front-rear direction in the center of the center floor 10. The center tunnel 11 may be provided in a form in which a central portion of the center floor 10 is raised upward so that a long valley portion is formed in the front-rear direction on a lower surface of the center floor 10.

The left side sill 12a and the right side sill 12b are provided at left and right ends of the center floor 10. The left side sill 12a and the right side sill 12b extend long in the front-rear direction to increase the front-rear bending stiffness of the center floor 10 together with the center tunnel 11.

The first cross member 13 is coupled to the lower surface of the center floor 10 in front of the battery mounting part 40.

The first cross member 13 extends in a left-right direction and has opposite ends connected to the left side sill 12a and the right side sill 12b, respectively. The second cross member 14 is coupled to the lower surface of the center floor 10 behind the battery mounting part 40. The second cross member 14 also extends in the left-right direction and has opposite ends connected to the left side sill 12a and the right side sill 12b, respectively. The first cross member 13 and the second cross member 14 reinforce the center floor 10 to the front and rear of the battery mounting part 40, respectively, to increase the left-right bending stiffness of the vehicle body structure.

The left and right center side members 15a and 15b are coupled to the lower surface of the center floor 10 in a state of being spaced apart from each other in the left-right direction and extend in the front-rear direction to connect the first cross member 13 and the second cross member 14.

The left center side member 15a is disposed between the center tunnel 11 and the left side sill 12a, and the right center side member 15b is disposed between the center tunnel 11 and the right side sill 12b. Accordingly, the left center side member 15a and the right center side member 15b increase the front-rear bending stiffness of the battery mounting part 40 of the center floor 10.

As illustrated in FIG. 3, the left and right front side members 16a and 16b extend forward from both sides of the first cross member 13 at a position where the left and right center side members 15a and 15b are connected, respectively. Also, the left and right front side members 16a and 16b may be connected to the left side sill 12a and the right side sill 12b by extension structures 17a and 17b extending diagonally from each side thereof. Accordingly, the left and right front side members 16a and 16b may reinforce a front area of the center floor 10.

As illustrated in FIG. 2, the rear floor 20 may have a front end connected to a rising connection portion 19 extending upward from a rear end of the center floor 10. The rising connection portion 19 forms a step between the front end of the rear floor 20 and the rear end of the center floor 10 by bending and extending upward from the rear of the second cross member 14. As such, when a height of the rear floor 20 is higher than the center floor 10, the fuel tank mounting part 60 may be provided below the rear floor 20, and the left-right bending stiffness and transverse collision stiffness of the vehicle body structure may be increased.

As illustrated in FIGS. 2 to 4, the rear floor 20 may include left and right rear side members 21a and 21b, a third cross member 22, a fourth cross member 23, and left and right extension members 24a and 24b. Left and right reinforcing frames 25a and 25b may be installed at a connection portion between the rear floor 20 and the center floor 10 where the rising connection portion 19 is located.

The left and right rear side members 21a and 21b extend in the front-rear direction on both sides of the rear floor 20 to increase the front-rear bending stiffness of the rear floor 20, and may be connected to rear ends of the left side sill 12a and the right side sill 12b, respectively.

The third cross member 22 is provided at a portion where the front end of the rear floor 20 in the front of the fuel tank mounting part 60 and an upper end of the rising connection portion 19 are connected. The third cross member 22 extends in the left-right direction and has opposite ends connected to the left and right rear side members 21a and 21b, respectively, to increase the left-right bending stiffness of a front area of the fuel tank mounting part 60 and reinforce an upper side of the rising connection portion 19.

The fourth cross member 23 is coupled to a lower surface of the rear floor 20 behind the fuel tank mounting part 60. The fourth cross member 23 also extends in the left-right direction and has opposite ends connected to the left and right rear side members 21a and 21b, respectively, to increase the left-right bending stiffness of the rear floor 20 where the fuel tank mounting part 60 is located.

The left and right reinforcing frames 25a and 25b extend rearward from rear ends of the left and right center side members 15a and 15b, respectively, and are coupled to both sides of the rising connection portion 19, respectively. The left and right reinforcing frames 25a and 25b extend toward the third cross member 22 from a position where the left and right center side members 15a and 15b and the second cross member 14 are connected to be connected to both sides of the third cross member 22, respectively. The left and right reinforcing frames 25a and 25b reinforce the rising connection portion 19 located at a boundary between the center floor 10 and the rear floor 20, which is located in front of the fuel tank mounting part 60.

The left and right reinforcing frames 25a and 25b are connected to the third cross member 22, and at the same time, connect the rear ends of the left and right center side members 15a and 15b and front ends of the left and right extension members 24a and 24b in series, respectively, to increase the front-rear collision stiffness and bending stiffness of the vehicle body structure.

The left and right extension members 24a and 24b extend rearward from rear ends of the left and right reinforcing frames 25a and 25b, respectively. That is, the left and right extension members 24a and 24b extend rearward from the third cross member 22 at a position where the left and right reinforcing frames 25a and 25b are connected to be connected to both sides of the fourth cross member 23, respectively. The left and right extension members 24a and 24b increase the front-rear bending stiffness of the rear floor 20 where the fuel tank mounting part 60 is located.

Figure 7:
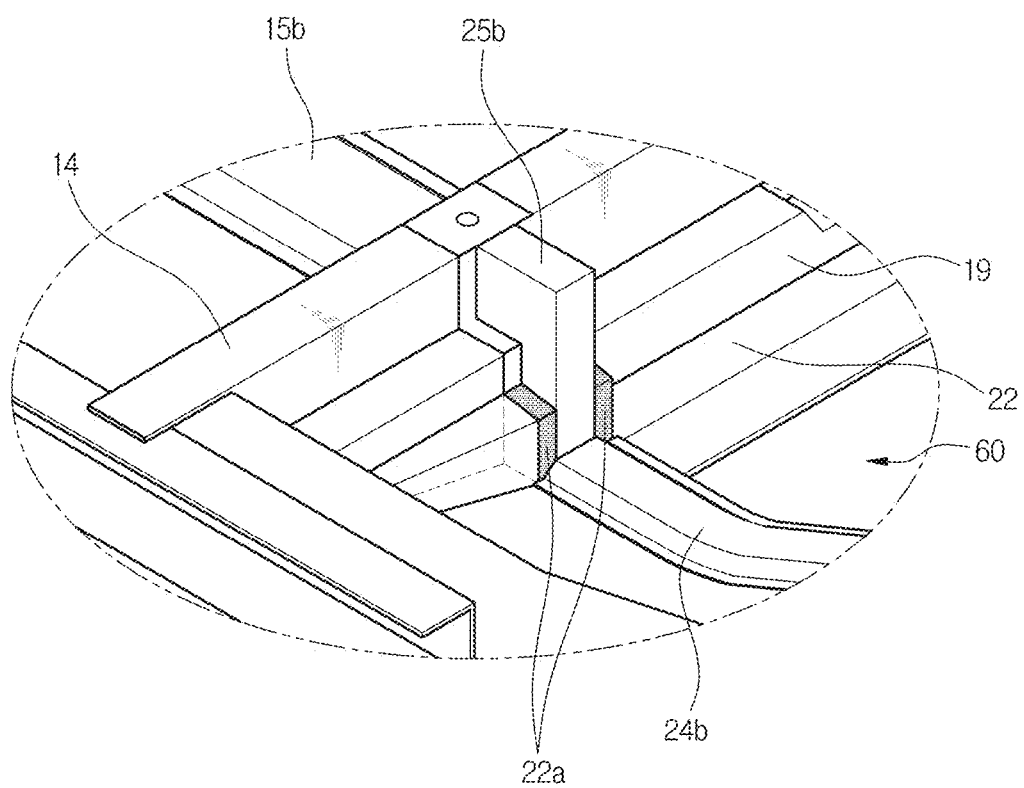
FIG. 7 is a detailed view of part VII in FIG. 4.

Referring to FIG. 7, a plurality of reinforcing members 22a are provided on the third cross member 22 at a position where the rear ends of the left and right reinforcing frames 25a and 25b and the front ends of the left and right extension members 24a and 24b are connected, to increase the rigidity of the connection portion. The plurality of reinforcing members 22a may be accommodated in the third cross member 22 and be welded to both the rear ends of the left and right reinforcing frames 25a and 25b and to the front ends of the left and right extension members 24a and 24b to reinforce the connection portion.

As illustrated in FIGS. 1 to 3, the vehicle body structure according to embodiments of the disclosure may increase the front-rear bending stiffness because the left and right front side members 16a and 16b, the left and right center side members 15a and 15b, the left and right reinforcing frames 25a and 25b, and the left and right extension members 24a and 24b are arranged to be continuously connected in the front-rear direction. In addition, as collision energy is sequentially transmitted to the rear through the left and right front side members 16a and 16b, the left and right center side members 15a and 15b, the left and right reinforcing frames 25a and 25b, and the left and right extension members 24a and 24b when a vehicle collides in the front, the collision energy may be dispersed to the first to fourth cross members 13, 14, 22, and 23, the battery mounting part 40, and the fuel tank mounting part 60.

Figure 5:
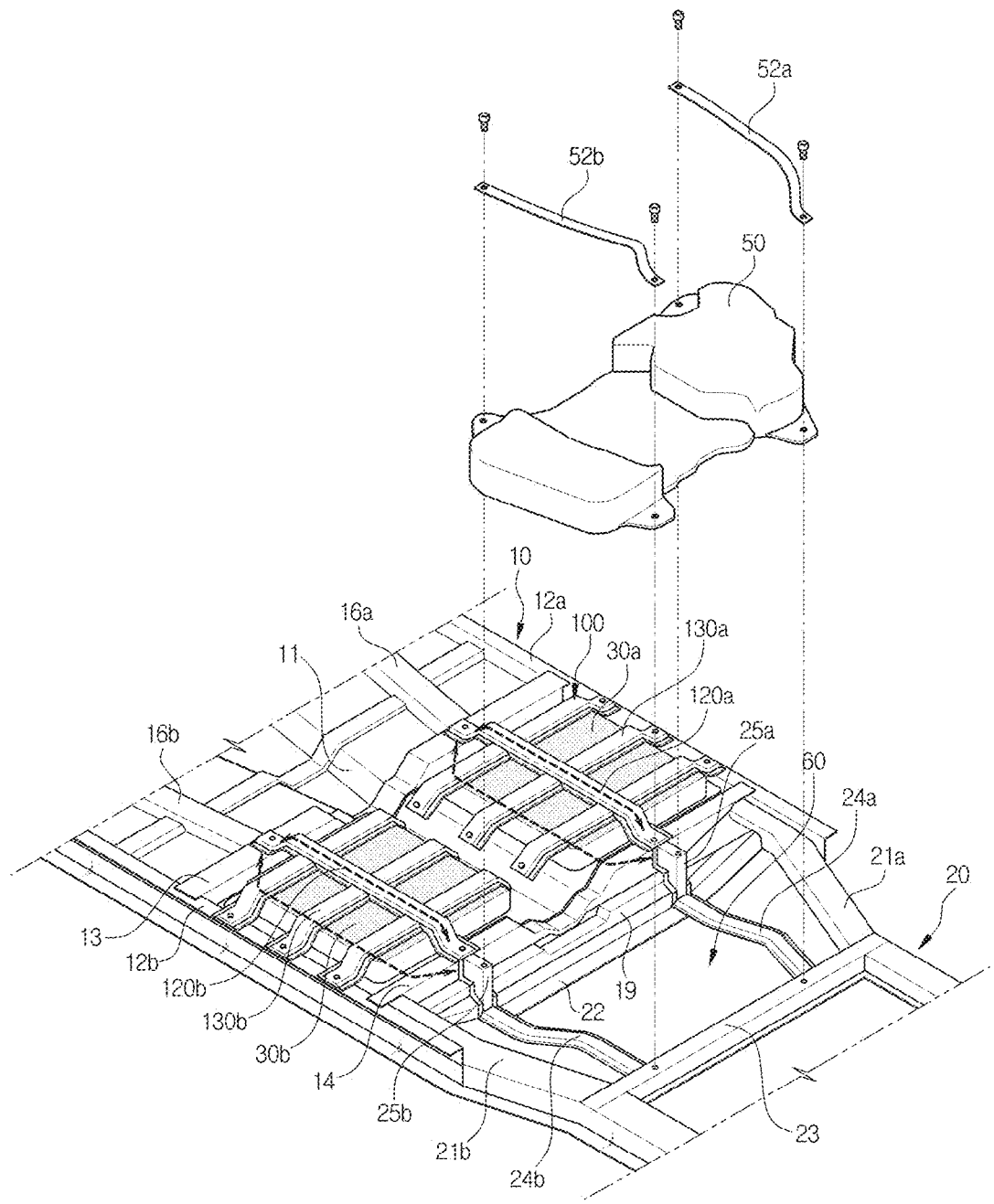
FIG. 5 is a bottom perspective view of the vehicle body structure according to an embodiment of the disclosure from which the fuel tank is separated.

Referring to FIGS. 2, 4 and 5, the battery coupling structure 100 may include a battery support panel 110, a left coupling frame 120a, a right coupling frame 120b, and a plurality of transverse coupling frames 130a and 130b.

The battery support panel 110 may be formed in a shape in which a flat panel is substantially corresponding to the shape of the battery mounting part 40 below the center floor 10. The battery support panel 110 may include a tunnel part 11 coupled to correspond to the center tunnel 11 of the center floor 10 and has an upper surface mounted on the lower surface of the center floor 10 between the first cross member 13 and the second cross member 14. On a lower surface of the battery support panel 110, the two batteries 30a and 30b, which are disposed symmetrically to each other on both sides of the tunnel part in, may be mounted.

The left coupling frame 120a couples a lower portion of the left battery 30a in the front-rear direction. One side of the left coupling frame 120a is fastened to the first cross member 13 at a position where a front end of the left center side member 15a is connected, and the other side of the left coupling frame 120a is fastened to the second cross member 14 at a position where the rear end of the left center side member 15a is connected. Accordingly, because the left coupling frame 120a annularly couples an outer side of the left battery 30a together with the left center side member 15a, the left coupling frame 120a functions to increase the front-rear bending stiffness and collision stiffness of the vehicle body structure as well as the coupling of the left battery 30a.

The right coupling frame 120b couples a lower portion of the right battery 30b in the front-rear direction. One side of the right coupling frame 120b is fastened to the first cross member 13 at a position where a front end of the right center side member 15b is connected, and the other side of the right coupling frame 120b is fastened to the second cross member 14 at a position where the rear end of the right center side member 15b is connected. Accordingly, because the right coupling frame 120b also annularly couples an outer side of the right battery 30b together with the right center side member 15b, the right coupling frame 120b functions to increase the front-rear bending stiffness and collision stiffness of the vehicle body structure as well as the coupling of the right battery 30b.

The plurality of transverse coupling frames 130a and 130b includes the left transverse coupling frames 130a coupling the lower portion of the left battery 30a together with the left coupling frame 120a in the transverse direction and spaced apart from each other in the front-rear direction, and the right transverse coupling frames 130b coupling the lower portion of the right battery 30b together with the right coupling frame 120b in the transverse direction and spaced apart from each other in the front-rear direction.

First sides of the left transverse coupling frames 130a are fastened to the left side sill 12a and second sides of the left transverse coupling frames 130a are fastened to the tunnel part 111 of the battery support panel 110. First sides of the right transverse coupling frames 130b are fastened to the right side sill 12b and second sides of the right transverse coupling frames 130b are fastened to the tunnel part 111 of the battery support panel 110.

The battery coupling structure 100 may be pre-assembled to the battery support panel 110 so that the plurality of transverse coupling frames 130a and 130b and the left and right coupling frames 120a and 120b couple the batteries 30a and 30b, and then may be mounted on the battery mounting part 40 below the center floor 10.

The battery coupling structure 100 of the present embodiment presents a case in which the left transverse coupling frames 130a and the right transverse coupling frames 130b are separated so that the left battery 30*a* and the right battery 30*b* on both sides of the center tunnel 11 may be separately coupled. However, in a case where a large battery in which a left battery and a right battery are integrated in a vehicle body structure without the center tunnel 11 is coupled, each of the transverse coupling frames may extend long from the left side sill 12*a* to the right side sill 12*b*.

As illustrated in FIG. 2, reinforcing members 13*a* to reinforce rigidity may be installed at positions inside the first cross member 13 and the second cross member 14 where the left and right coupling frames 120*a* and 120*b* are fastened.

The battery coupling structure 100 as described above not only may have a function of firmly fixing the left and right batteries 30*a* and 30*b*, but also may increase the front-rear bending stiffness, the left-right bending stiffness, the torsional stiffness, and the collision stiffness in the front-rear and left-right directions.

Figure 6:
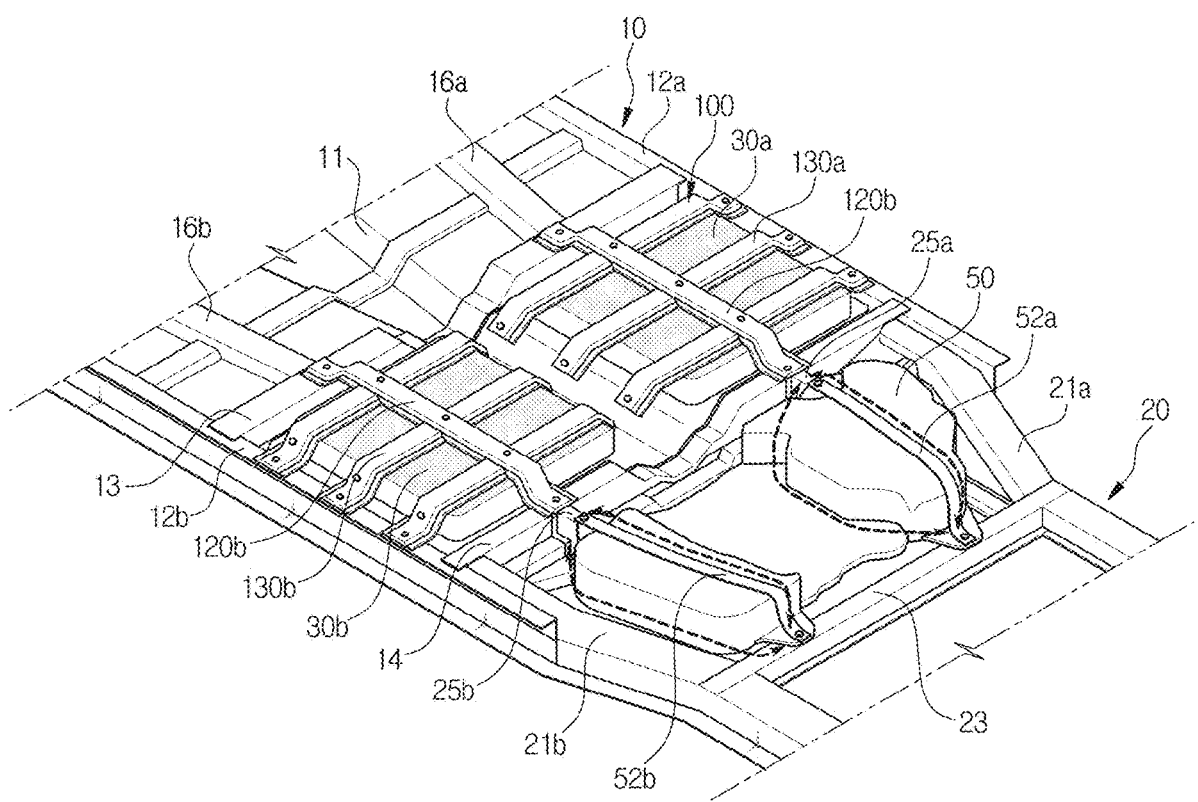
FIG. 6 is a bottom perspective view of the vehicle body structure according to an embodiment of the disclosure on which the batteries and the fuel tank are mounted.

Referring to FIGS. 2, 5 and 6, the fuel tank 50 is mounted on the fuel tank mounting part 60 below the rear floor 20 by fastening a left coupling band 52*a* and a right coupling band 52*b*.

One side of the left coupling band 52*a* is fastened to the left reinforcing frame 25*a* to couple a lower portion of the fuel tank 50 in the front-rear direction, and the other side of the left coupling band 52*a* is fastened to a position of the fourth cross member 23 to which the left extension member 24*a* is connected.

One side of the right coupling band 52*b* is fastened to the right reinforcing frame 25*b* to couple the lower portion of the fuel tank 50 in the front-rear direction, and the other side of the right coupling band 52*b* is fastened to a position of the fourth cross member 23 to which the right extension member 24*b* is connected.

As illustrated in FIG. 2, the left and right reinforcing frames 25*a* and 25*b* and the fourth cross member 23 may include a plurality of reinforcing members 27 and 23*a* provided therein to reinforce portions to which the left and right coupling bands 52*a* and 52*b* are fastened.

As illustrated in FIG. 6, the fuel tank mounting structure as described above may firmly fix the fuel tank 50 because the left coupling band 52*a* annularly couples a left outer surface of the fuel tank 50 together with the left extension member 24*a*, and the right coupling band 52*b* annularly couples a right outer surface of the fuel tank 50 together with the right extension member 24*b*.

In addition, the fuel tank mounting structure may increase the rigidity of the vehicle body structure because the fuel tank 50 also functions as a structure of being connected to the left and right reinforcing frames 25*a* and 25*b*, the left and right extension members 24*a* and 24*b*, and the fourth cross member 23. When a vehicle collides in the front, collision energy transmitted to the left and right reinforcing frames 25*a* and 25*b* may be dispersed to the fuel tank 50.

As is apparent from the above, a vehicle body structure according to an embodiment of the disclosure can firmly fix batteries below a floor because a battery coupling structure to support a lower portion of the batteries is fastened to first and second cross members connected to left and right center side members.

The vehicle body structure according to an embodiment of the disclosure can increase front-rear bending stiffness, left-right bending stiffness, torsional stiffness, and collision stiffness in front-rear and left-right directions because a battery coupling structure reinforces the rigidity of a center floor side together with the left and right center side members, the first cross member, and the second cross member.

The vehicle body structure according to an embodiment of the disclosure can increase the front-rear bending stiffness because left and right front side members, left and right center side members, left and right reinforcing frames, and left and right extension members are arranged to be continuously connected in the front-rear direction.

According to the vehicle body structure according to an embodiment of the disclosure, as collision energy is sequentially transmitted to the left and right front side members, the left and right center side members, the left and right reinforcing frames, and the left and right extension members when a vehicle collides in the front, the collision energy can be dispersed to the first to fourth cross members, a battery mounting part, and the fuel tank mounting part.

The vehicle body structure according to an embodiment of the disclosure can have a high rigidity because a fuel tank functions as a structure of being connected to the left and right reinforcing frames, the left and right extension members, and the fourth cross member. Also, when a vehicle collides in the front, the collision energy transmitted to the left and right reinforcing frames can also be dispersed to the fuel tank.

What is claimed is:

1. A vehicle body structure comprising:
   a battery mounting part provided below a floor and configured to mount at least one battery;
   a first cross member configured to reinforce the floor in front of the battery mounting part;
   a second cross member configured to reinforce the floor behind the battery mounting part;
   left and right center side members extending in a front-rear direction and connecting the first cross member and the second cross member, wherein the left and right center side members are spaced apart from each other in a left-right direction and are configured to reinforce a portion of the floor on which the battery mounting part is located;
   a fuel tank mounting part provided below the floor behind the second cross member and configured to mount a fuel tank;
   left and right reinforcing frames extending rearward from rear ends of the left and right center side members, respectively, and configured to reinforce the floor in front of the fuel tank mounting part;
   left and right extension members extending rearward from rear ends of the left and right reinforcing frames, respectively, and configured to reinforce a portion of the floor on which the fuel tank mounting part is located; and
   a battery coupling structure installed below the floor, wherein the battery coupling structure comprises:
     a battery support panel installed below the floor between the first cross member and the second cross member;
     a left coupling frame coupling a lower portion of the battery in the front-rear direction of the vehicle and having a first side fastened to the first cross member at a position where the left center side member is connected and a second side fastened to the second cross member at a position where the left center side member is connected, wherein the left coupling frame annularly couples a first outer side of the battery together with the left center side member; and
     a right coupling frame coupling the lower portion of the battery in the front-rear direction of the vehicle and having a first side fastened to the first cross member at a position where the right center side member is connected and a second side fastened to the second cross member at a position where the right center side member is connected, wherein the right coupling frame annularly couples a second outer side of the battery together with the right center side member.

2. The vehicle body structure according to claim 1, further comprising:
a third cross member connected to rear ends of the left and right reinforcing frames and front ends of the left and right extension members and configured to reinforce the floor in front of the fuel tank mounting part; and
a fourth cross member connected to the left and right extension members and configured to reinforce the floor behind the fuel tank mounting part.

3. The vehicle body structure according to claim 2, further comprising a plurality of reinforcing members provided on the third cross member and configured to reinforce portions where the rear ends of the left and right reinforcing frames and the front ends of the left and right extension members are connected.

4. The vehicle body structure according to claim 2, further comprising:
a left coupling band having a first side fastened to the left reinforcing frame and a second side fastened to the fourth cross member at a position where the left extension member is connected and configured to couple a lower portion of the fuel tank in the front-rear direction; and
a right coupling band having a first side fastened to the right reinforcing frame and a second side fastened to the fourth cross member at a position where the right extension member is connected and configured to couple the lower portion of the fuel tank in the front-rear direction.

5. The vehicle body structure according to claim 4, further comprising a plurality of reinforcing members provided on the left and right reinforcing frames and the fourth cross member and configured to reinforce portions to which the left and right coupling bands are fastened.

6. A vehicle body structure comprising:
a battery mounting part provided below a floor and configured to mount at least one battery;
a first cross member configured to reinforce the floor in front of the battery mounting part;
a second cross member configured to reinforce the floor behind the battery mounting part;
left and right center side members extending in a front-rear direction and connecting the first cross member and the second cross member, wherein the left and right center side members are spaced apart from each other in a left-right direction and are configured to reinforce a portion of the floor on which the battery mounting part is located;
a fuel tank mounting part provided below the floor behind the second cross member and configured to mount a fuel tank;
left and right reinforcing frames extending rearward from rear ends of the left and right center side members, respectively, and configured to reinforce the floor in front of the fuel tank mounting part;
left and right extension members extending rearward from rear ends of the left and right reinforcing frames, respectively, and configured to reinforce a portion of the floor on which the fuel tank mounting part is located;
left and right front side members extending forward from both sides of the first cross member at positions to which the left and right center side members are connected, respectively, and configured to reinforce a front area of the floor; and
a battery coupling structure installed below the floor and configured to couple the at least one battery to the first and second cross members, wherein the battery coupling structure comprises:
a battery support panel installed below the floor between the first cross member and the second cross member;
a left coupling frame configured to couple a lower portion of the at least one battery in the front-rear direction and having a first side fastened to the first cross member at a position where the left center side member is connected and a second side fastened to the second cross member at a position where the left center side member is connected, wherein the left coupling frame annularly couples a first outer side of the at least one battery together with the left center side member; and
a right coupling frame configured to couple the lower portion of the at least one battery in the front-rear direction and having a first side fastened to the first cross member at a position where the right center side member is connected and a second side fastened to the second cross member at a position where the right center side member is connected, wherein the right coupling frame annularly couples a second outer side of the at least one battery together with the right center side member.

7. The vehicle body structure according to claim 6, further comprising left and right side sills connected to the first and second cross members, extending long in the front-rear direction and configured to reinforce left and right ends of the floor, respectively.

8. The vehicle body structure according to claim 6, wherein the battery coupling structure further comprises a plurality of transverse coupling frames fastened to the left or right side sill and the battery support panel and configured to couple the lower portion of the at least one battery in the left-right direction.

9. The vehicle body structure according to claim 6, further comprising a plurality of reinforcing members provided on the first cross member and the second cross member and configured to reinforce portions to which the left and right coupling frames are fastened.

10. A vehicle comprising:
a vehicle body including a floor extending in a front-rear direction of the vehicle and in a left-right direction of the vehicle;
a battery mounting part provided below the floor;
a battery mounted to the battery mounting part;
a first cross member configured to reinforce the floor in front of the battery mounting part;
a second cross member configured to reinforce the floor behind the battery mounting part;
left and right center side members extending in the front-rear direction of the vehicle and connecting the first cross member and the second cross member, wherein the left and right center side members are spaced apart from each other in the left-right direction of the vehicle and are configured to reinforce a portion of the floor on which the battery mounting part is located;

a fuel tank mounting part provided below the floor behind the second cross member;
a fuel tank mounted on the fuel tank mounting part;
left and right reinforcing frames extending rearward from rear ends of the left and right center side members, respectively, and configured to reinforce the floor in front of the fuel tank mounting part;
left and right extension members extending rearward from rear ends of the left and right reinforcing frames, respectively, and configured to reinforce a portion of the floor on which the fuel tank mounting part is located; and
a battery coupling structure installed below the floor, wherein the battery coupling structure comprises:
a battery support panel installed below the floor between the first cross member and the second cross member;
a left coupling frame coupling a lower portion of the battery in the front-rear direction of the vehicle and having a first side fastened to the first cross member at a position where the left center side member is connected and a second side fastened to the second cross member at a position where the left center side member is connected, wherein the left coupling frame annularly couples a first outer side of the battery together with the left center side member; and
a right coupling frame coupling the lower portion of the battery in the front-rear direction of the vehicle and having a first side fastened to the first cross member at a position where the right center side member is connected and a second side fastened to the second cross member at a position where the right center side member is connected, wherein the right coupling frame annularly couples a second outer side of the battery together with the right center side member.

11. The vehicle according to claim 10, further comprising:
a third cross member connected to rear ends of the left and right reinforcing frames and front ends of the left and right extension members and configured to reinforce the floor in front of the fuel tank mounting part; and
a fourth cross member connected to the left and right extension members and configured to reinforce the floor behind the fuel tank mounting part.

12. The vehicle according to claim 11, further comprising a plurality of reinforcing members provided on the third cross member and configured to reinforce portions where the rear ends of the left and right reinforcing frames and the front ends of the left and right extension members are connected.

13. The vehicle according to claim 11, further comprising:
a left coupling band having a first side fastened to the left reinforcing frame and a second side fastened to the fourth cross member at a position where the left extension member is connected to couple a lower portion of the fuel tank in the front-rear direction of the vehicle;
a right coupling band having a first side fastened to the right reinforcing frame and a second side fastened to the fourth cross member at a position where the right extension member is connected to couple the lower portion of the fuel tank in the front-rear direction of the vehicle; and
a plurality of reinforcing members provided on the left and right reinforcing frames and the fourth cross member and configured to reinforce portions to which the left and right coupling bands are fastened.

14. The vehicle according to claim 10, further comprising left and right front side members extending forward from both sides of the first cross member at positions to which the left and right center side members are connected, respectively, and configured to reinforce a front area of the floor.

15. The vehicle according to claim 14, further comprising left and right side sills connected to the first and second cross members, extending long in the front-rear direction of the vehicle and configured to reinforce left and right ends of the floor, respectively.

16. The vehicle according to claim 10, wherein the battery coupling structure further comprises a plurality of transverse coupling frames fastened to the left or right side sill and the battery support panel and coupling the lower portion of the battery in the left-right direction of the vehicle.

17. The vehicle according to claim 10, further comprising a plurality of reinforcing members provided on the first cross member and the second cross member and configured to reinforce portions to which the left and right coupling frames are fastened.

18. The vehicle body structure according to claim 6, further comprising:
a third cross member connected to rear ends of the left and right reinforcing frames and front ends of the left and right extension members and configured to reinforce the floor in front of the fuel tank mounting part; and
a fourth cross member connected to the left and right extension members and configured to reinforce the floor behind the fuel tank mounting part.

19. The vehicle body structure according to claim 18, further comprising a plurality of reinforcing members provided on the third cross member and configured to reinforce portions where the rear ends of the left and right reinforcing frames and the front ends of the left and right extension members are connected.

20. The vehicle body structure according to claim 18, further comprising:
a left coupling band having a first side fastened to the left reinforcing frame and a second side fastened to the fourth cross member at a position where the left extension member is connected and configured to couple a lower portion of the fuel tank in the front-rear direction; and
a right coupling band having a first side fastened to the right reinforcing frame and a second side fastened to the fourth cross member at a position where the right extension member is connected and configured to couple the lower portion of the fuel tank in the front-rear direction.

* * * * *